(12) United States Patent
Kralik et al.

(10) Patent No.: US 11,271,384 B2
(45) Date of Patent: Mar. 8, 2022

(54) POWER SUPPLY INTERLOCK

(71) Applicant: Western Technology, Inc., Bremerton, WA (US)

(72) Inventors: Michael Kralik, Bremerton, WA (US); Brandon McLellan, Bremerton, WA (US)

(73) Assignee: Western Technology, Inc., Bremerton, WA (US)

( * ) Notice: Subject to any disclaimer, the term of this patent is extended or adjusted under 35 U.S.C. 154(b) by 657 days.

(21) Appl. No.: 16/047,881

(22) Filed: Jul. 27, 2018

(65) Prior Publication Data

US 2019/0036322 A1 Jan. 31, 2019

Related U.S. Application Data

(60) Provisional application No. 62/537,787, filed on Jul. 27, 2017.

(51) Int. Cl.
| | | |
|---|---|---|
| *H02H 3/02* | (2006.01) | |
| *G05B 19/048* | (2006.01) | |
| *H02H 1/00* | (2006.01) | |
| *G05B 19/042* | (2006.01) | |
| *H04B 3/54* | (2006.01) | |

(52) U.S. Cl.
CPC ............ *H02H 3/021* (2013.01); *G05B 19/048* (2013.01); *G05B 19/0425* (2013.01); *H02H 1/0007* (2013.01); *H04B 3/54* (2013.01); *G05B 2219/25357* (2013.01); *H04B 2203/5458* (2013.01)

(58) Field of Classification Search
CPC .... H02H 3/021; H02H 1/0007; G05B 19/048; G05B 19/0425; G05B 19/54; G05B 2219/25357; H04B 2203/5458
See application file for complete search history.

(56) References Cited

U.S. PATENT DOCUMENTS

| | | |
|---|---|---|
| 3,390,369 A | 6/1968 | Zavertnik et al. |
| 3,491,326 A | 1/1970 | Pfister et al. |
| 3,805,216 A | 4/1974 | Gaspar et al. |
| 4,150,866 A | 4/1979 | Snyder, Jr. et al. |

(Continued)

FOREIGN PATENT DOCUMENTS

| | | |
|---|---|---|
| CN | 201187753 Y | 1/2009 |
| CN | 204809563 U | 11/2015 |
| EP | 2541689 A1 | 1/2013 |

OTHER PUBLICATIONS

Amphenol Corporation; "97 Series—Amphenol®"; (May 30, 2012); 22 pages; Standard Cylindrical Connector 12-022-16; Amphenol Industrial Operations.

(Continued)

*Primary Examiner* — Jue Zhang
(74) *Attorney, Agent, or Firm* — Thorpe North & Western

(57) ABSTRACT

Load control interlocks are disclosed and described. The interlocks provide for coupling a power circuit to one or more load circuits once the one or more load circuits and the power circuit are both coupled to the interlock, and disconnects the power circuit from the one or more load circuits if the one or more load circuits or the power circuit are uncoupled form the interlock or an electrical connection between the power circuit and the one or more load circuits is broken.

13 Claims, 10 Drawing Sheets

(56) References Cited

U.S. PATENT DOCUMENTS

| | | | |
|---|---|---|---|
| 4,176,898 | A | 12/1979 | Marechal |
| 4,540,230 | A | 9/1985 | Iversen et al. |
| 4,628,392 | A | 12/1986 | Didier |
| 4,825,986 | A | 5/1989 | Pepper |
| 5,408,149 | A | 4/1995 | Aneha et al. |
| 5,565,714 | A | 10/1996 | Cunningham |
| 5,582,519 | A | 12/1996 | Buchter |
| 5,621,256 | A | 4/1997 | Crane et al. |
| 5,762,510 | A | 6/1998 | Taniguchi et al. |
| 5,863,221 | A | 1/1999 | Castaldo |
| 6,146,210 | A | 11/2000 | Cha et al. |
| 6,162,082 | A | 12/2000 | Karsten et al. |
| 6,372,993 | B1 | 4/2002 | Eckels et al. |
| 6,552,888 | B2 | 4/2003 | Weinberger |
| 6,685,493 | B2 | 2/2004 | Birkenmaier et al. |
| 6,793,510 | B2 | 9/2004 | Yamakawa et al. |
| 6,866,529 | B2 | 3/2005 | Hobson et al. |
| 6,902,412 | B2 | 6/2005 | Higgins |
| 6,932,636 | B2 | 8/2005 | Abbey et al. |
| 7,794,252 | B2 | 9/2010 | Sauer et al. |
| 7,922,529 | B1 | 4/2011 | Meurer |
| 8,482,885 | B2 | 7/2013 | Billingsley et al. |
| 8,721,355 | B2 | 5/2014 | Belack |
| 8,729,741 | B2 | 5/2014 | Lai |
| 8,905,795 | B2 | 12/2014 | Kim et al. |
| 9,088,094 | B2 | 7/2015 | Iyer et al. |
| 9,437,381 | B2 | 9/2016 | Hassan-Ali et al. |
| 9,564,277 | B2 | 2/2017 | Cruz et al. |
| 2004/0108843 | A1* | 6/2004 | Lanni .................. H02M 1/10 323/271 |
| 2011/0121663 | A1 | 5/2011 | Coffey et al. |
| 2013/0093242 | A1 | 4/2013 | Mok et al. |
| 2013/0093381 | A1 | 4/2013 | McGinley et al. |
| 2014/0270645 | A1 | 9/2014 | Toth |
| 2014/0285318 | A1 | 9/2014 | Audéon et al. |
| 2016/0079749 | A1 | 3/2016 | Jung et al. |
| 2016/0111870 | A1 | 4/2016 | Murano et al. |
| 2016/0182039 | A1 | 6/2016 | Xiao et al. |
| 2016/0370547 | A1 | 12/2016 | Logan, Jr. et al. |
| 2017/0222546 | A1* | 8/2017 | Netsu .................. H01R 31/065 |

OTHER PUBLICATIONS

Ken Shirriff; "Magsafe: Teardown and Exploration of Apple's Magsafe Connector"; Apple; Ken Shirriff's Blog—Charger, Microprocessors, Arduino, and Whatever; (Jun. 2, 2013); 35 pages; kens@arcfn.com; [retrieved on Feb. 6, 2017]; Retrieved from <URL: http://www.righto.com/2013/06/teardown-and-exploration-of-magsafe.html>.

Meltric Corporation; "DXN Hazardous Location Rated Plugs and Receptacles—ATEX and CSA"; (Jul. 12, 2017); 2 pages; [retrieved on Oct. 18, 2018]; Retrieved from <URL: http://www.meltric.com/html/dxn-hazardous-location.html#>.

Nevon Projects; "Power Supply with Auto Switching"; Nevon; (Mar. 17, 2013); 4 pages; [retrieved on Feb. 12, 2017]; Retrieved from <URL: http://nevonprojects.com/power-supply-with-auto-switching-project/ >.

* cited by examiner

POWER SUPPLY INTERLOCK

RELATED APPLICATION

This application claims priority to U.S. Provisional Application No. 62/537,787, filed Jul. 27, 2018 which is incorporated herein by reference.

BACKGROUND

When connecting a load to a power source, arching, sparking or the like can occur. In addition, arching and sparking can occur when a cable that connects the load to the power source is damaged or severed. The arching and sparking can be very dangerous in combustible or explosive environments. Accordingly, there is a continuing need for power supplies that reduces the chance of electrical sparking when making connections or if a connection is severed.

SUMMARY

Embodiments of the present technology are directed toward a load control interlock for use with power supplies. The interlock includes a first switching module and a second switching module. The first switching module is configured to be in a first state when a first keyed signal is detected, and a second state a first predetermined period of time after a second keyed signal is detected. The second switching module is configured to un-couple a plurality of input terminals from a plurality of output terminals when the first switching module is in the first state, and to couple the plurality of terminals to the plurality of output terminals a second predetermined period of time after when the first switching module is in the second state.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
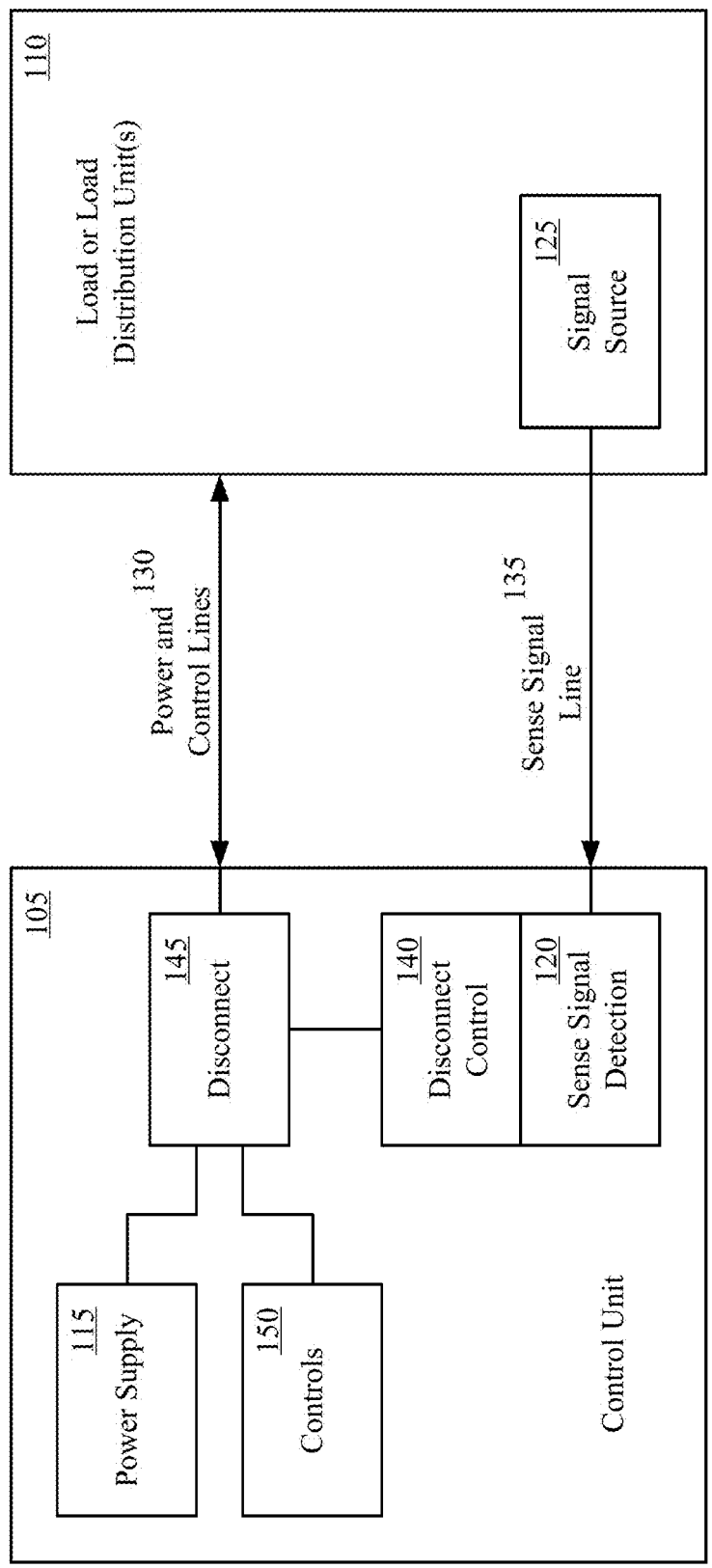
FIG. 1 shows a system with a load control interlock in accordance with an example.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The term "terminal" as used herein refers to a terminal, connector, jack, contact, plug, cable, node or any other direct, indirect, removably couplable connection.

The singular forms "a," "an," and "the" include plural referents unless the context clearly dictates otherwise. Thus, for example, reference to "a control" includes reference to one or more of such materials and reference to "relaying" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of" For example, "at least one of A, B and C" explicitly includes only A, only B, only C, and combinations of each.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Embodiments of the present technology are directed toward load control interlocks and systems which provide an auto continuity monitoring power supply. In one embodiment, the interlock can monitor connections between a power circuit and one or more load circuits. The load control interlock disconnects power from the power circuit when the load is disconnected or the connection to the load broken. In one aspect, when the connection between a chassis ground of the interlock and a common of the load is opened, either by disconnecting the load or severing the cable connecting the load, driver outputs and control inputs can be disconnected from respective terminals of the interlock, and the driver outputs and control inputs can be coupled to the chassis ground. The input power to the drivers can also be disconnected. When the power source is turned on while the one or more loads are disconnected, a delay in the interlock prevents connection of the driver outputs and the control inputs from momentarily occurring during power up of the power source. With connections between the power circuit and the one or more load circuits made to the interlock, the chassis ground can be tied to the common of the one or more loads by a conductive loop formed through a shunt within the one or more loads. With the conductive loop complete, a delay in the interlock insures adequate connection time has been made before connection of the driver outputs and control inputs are made at the respective terminals of the interlock.

Furthermore, the system can include a power supply which can be configured to couple power to a cable. The power supply can be any suitable power supply which includes, but is not limited to, grid power, a generator, power cells, batteries, AC power supply, and the like which can include a power source, transformers, inverters, voltage multipliers, programmable power control circuitry, circuit protection circuitry, etc. More importantly, a sensor signal detection circuit can be configured to (1) receive a sensor signal from the cable; (2) recognize an interruption of the sensor signal received from the cable; and (3) interrupt the power coupled to the cable in response to the interruption of the sensor signal. Such a system substantially reduces or prevents sparks or delivery of power through the cable when a load or cable is damaged or disconnected. Cables can be hard coupled within the system or removable having disconnects at one or both ends.

FIG. 1 shows a system with a load control interlock in accordance with an example. The system can include a power supply and/or control unit, and one or more load or load distribution units 110. As illustrated, the power supply 115 can be integral to the control unit 105. In other embodiments, the power supply can be implemented separate from the control unit. The control unit 105 can also be integral to the power supply 115. The power supply 115 can be configured to couple power through one or more cables to the one or more load or load distribution units 110. Although not pictured in FIG. 1, in some examples, the control unit 105 can include a sensor signal source and detection circuit and the load or load distribution unit(s) 110 can include a sensor signal return circuit. Thus, the sensor signal can therefore originate in the control unit 105 or in the power supply 115. As with other embodiments, the sensor signal can be an electrical signal or an optical signal.

The one or more load or load distribution units 110 can include a sensor signal source 125. The sensing signal therefore originates in the load or load distribution unit 110. For example, such a signal can be created using any signal modification element such as, but not limited to, resistor, Zener diode, current source, voltage reference, RC/LC/LCR tank circuit, and the like. The sensor signal can be an electrical signal or an optical signal.

The one or more load or load distribution units 110 can be coupled by one or more cables 130, 135 to the power source 115, the detection circuit 120, and if present, the signal source. In one example, a single multiconductor cable can include one or more power and control lines 130 and one or more sensor signal lines 135 for coupling the load or load distribution unit 110 to the control unit 105 and/or the power supply 115. In other examples, different combinations of cables can be used for power lines, control lines, and/or sensing lines. Thus, although illustrated as separate, spaced lines, the power and control lines 130 and the sensor signal line 135 can optionally be physically oriented within a common multiconductor cable. In one aspect, lines which do not pass through the interlock circuit (e.g. ground, etc.) may optionally have the sensor signal multiplexed thereon.

The signal detection circuit 120 can be configured to receive the sensor signal from the cable, recognize an interrupt of the sensor signal received from the cable, and interrupt power coupled to the cable in response to the interrupt. In one embodiment, the sensor signal detection circuit 120 can be configured to detect a continuity sensing signal received on a sensor signal line 135. A disconnect control circuit 140 can be configured to recognize an interruption in the signal received on the sensor signal line 135. The interruption may be indicative of the load or load distribution unit 110 being disconnected from the control unit 105 and/or power supply 115. The interruption may also be indicative of a failure in the integrity of the cable 130, 135 (e.g. damage or sever). A disconnect circuit 145 can be configured to disconnect power from one or more power lines of the cable. The disconnect circuit 145 can also be configured to disconnect one or more control signals from one or more corresponding control lines of the cable. Non-limiting examples of suitable disconnect mechanisms can include electromechanical switch (e.g. relay), electro-optical switch (e.g. solid state type relay), semiconductor switching device (e.g. MOSFET/bipolar transistor, Triac, SCR, etc.), and the like. In one alternative, a secondary sensing signal can be sent to a control panel or operator control booth once all connections have been detected as complete by the primary sensing signal. At that point, power could be sent to the system by the operator or an automated unit via completion of a connection with a power source via the power supply.

The sensing signal originating in the load or load distribution unit 110 propagates electrically and/or optically, within the one or more connecting cables 130, 135, to the sensor signal detection circuit 120, within the control unit 105 and/or power supply 115. The sensor signal detection circuit 120 operates, such that an interruption in one or more connections between it and the one or more load or load distribution units results in the disconnection of the one or more power supplies and/or control signals. The purpose of the sensor signal detection circuit 120 is to detect the integrity of the one or more cables, the connections between the one or more cables and the control unit 105, the one or more power supplies 115, the one or more load or load distribution units 110, and/or the continuity within the one or more load or load distribution units 110.

As noted above, in another example embodiment, the sensor signal can originate at a signal source in the control unit 105. In this example, (not pictured) a sensor signal source and a detection circuit in the control unit 105 can be coupled by the cable to a sensor signal return circuit of the load or load distribution unit 110. The sensor signal return can be configured to couple the sensor signal back to the sensor signal source and detection circuit of the control unit 105. The sensor signal originating from the sensor signal source and detection and the sensor signal received by the sensor signal source and detection circuit from the sensor signal return can propagate on the same pathway within the cable. In one embodiment, the sensor signal received by the sensor signal source and detection circuit can be unmodified from the sensor signal originating from the sensor signal source and detection circuit. In another embodiment, the sensor signal may be modified by the sensor signal return circuit. In one instance, the sensor signal may be modulated by the sensor signal return circuit before returning to the sensor signal source and detection circuit. In one example, a DC sensor voltage can be modulated by a fixed frequency, set of frequencies, or data stream, riding on top of the DC voltage.

Figure 2:
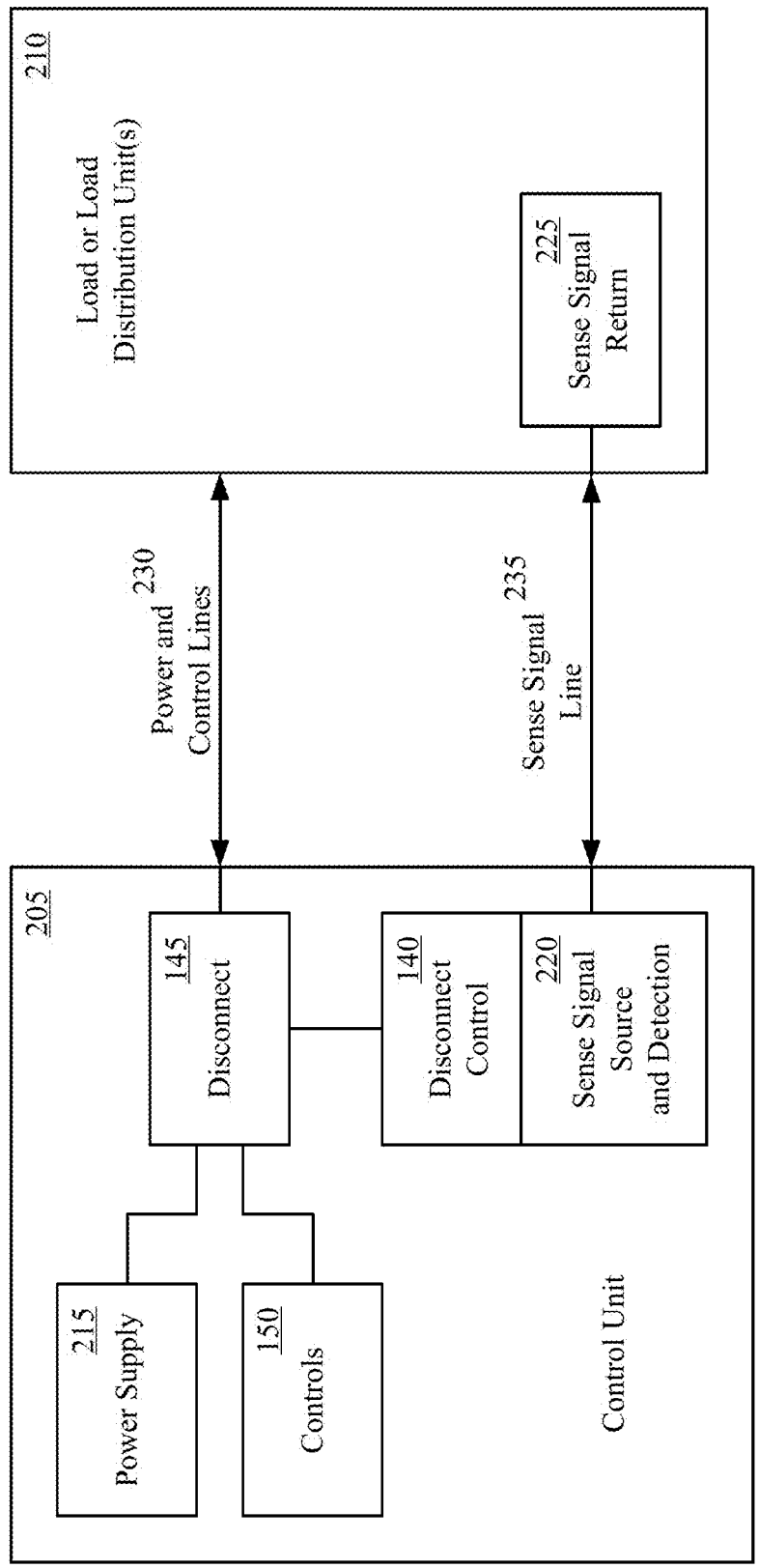
FIG. 2 shows a system with a load control interlock in accordance with another example.

FIG. 2 shows a system with a load control interlock in accordance with another example. The system can include a power supply and/or control unit, and one or more load or load distribution units 210. As illustrated, the power supply 215 can be integral to the control unit 205. In other embodiments, the power supply 215 can be implemented separate from the control unit 205. The control unit 205 can alternatively be integral to the power supply 215. In this example, the control unit 205 can include a sensor signal source and detection circuit 220. Thus, the sensor signal therefore originates in the control unit 205 or power supply 215. As with other embodiments, the sensor signal can be an electrical signal or an optical signal.

The load or load distribution unit 210 can be coupled by one or more cables 230, 235 to the power source 215 and the sensor signal source and detection circuit 220. In one example, a single multiconductor cable can include one or more power and control lines 230 and one or more sensor signal lines 235 for coupling the load or load distribution unit 210 to the power supply 215 and/or control unit 205. In other examples, different combinations of cables can be used for power lines, control lines, and/or sensing lines. Thus, although illustrated as separate, spaced lines, the power and control lines 230 and the sensor signal line 235 can optionally be physically oriented within a common multiconductor cable. In one aspect, lines which do not pass through the interlock circuit (e.g. ground, etc.) may optionally have the sensor signal multiplexed thereon.

A sensor signal from the sensor signal source and detection circuit 220 can be coupled by the cable to a sensor signal return circuit 225 of the one or more load or load distribution unit 210. The sensor signal return 225 can be configured to couple the sensor signal back to the sensor signal source and detection circuit 220 of the control unit 205. The sensor signal originating from the sensor signal source and detection 220 and the sensor signal received by the sensor signal source and detection circuit 220 from the sensor signal return 225 can propagate on the same pathway within the cable. In one embodiment, the sensor signal received by the sensor signal source and detection circuit 220 can be unmodified from the sensor signal originating from the sensor signal source and detection circuit 220. In another embodiment, the sensor signal may be modified by the sensor signal return circuit 225. In one instance, the sensor signal may be modulated by the sensor signal return circuit 225 before returning to the sensor signal source and detection circuit 220. In one example, a DC sensor voltage can be modulated by a fixed frequency, set of frequencies, or data stream, riding on top of the DC voltage.

The sensor signal source and detection circuit 220 can be configured to receive the sensor signal from the cable, recognize an interrupt of the sensor signal received from the cable, and interrupt power coupled to the cable in response to the interrupt. In one embodiment, the sensor signal source and detection circuit 220 can be configured to detect a continuity sensing signal received on a sensor signal line 235. A disconnect control circuit 240 can be configured to recognize an interruption in the signal received on the sensor signal line 235. The interruption can be indicative of the load or load distribution unit 210 being disconnected from the control unit 205 and/or power supply 215. The interruption may also be indicative of a failure in the integrity of the cable 230, 235. A disconnect circuit 245 can be configured to disconnect power from one or more power lines of the cable. The disconnect circuit 245 can also be configured to disconnect one or more control signals from one or more corresponding control lines of the cable. Non-limiting examples of suitable disconnect mechanism can include electromechanical switch (e.g. relay), electro-optical switch (e.g. solid state type relay), semiconductor switching device (e.g. MOSFET/bipolar transistor, Triac, SCR, etc.), and the like.

The sensing signal originating in the control unit 205 or power supply 215 propagates electrically and/or optically within the one or more connecting cables 230, 235, to the sensor signal source and detection circuit 220, within the control unit 205 and/or power supply 215. The sensor signal source and detection circuit 220 operates, such that an interruption in one or more connections between it and the one or more load or load distribution units 210 results in the disconnection of the one or more power supplies and/or control signals. The purpose of the sensor signal source and detection circuit 220 is to detect the integrity of the one or more cables, the connections between the one or more cables and the control unit 205, the one or more power supplies 215, the one or more load or load distribution units 210, and/or the continuity within the one or more load or load distribution units 210.

Figure 3:
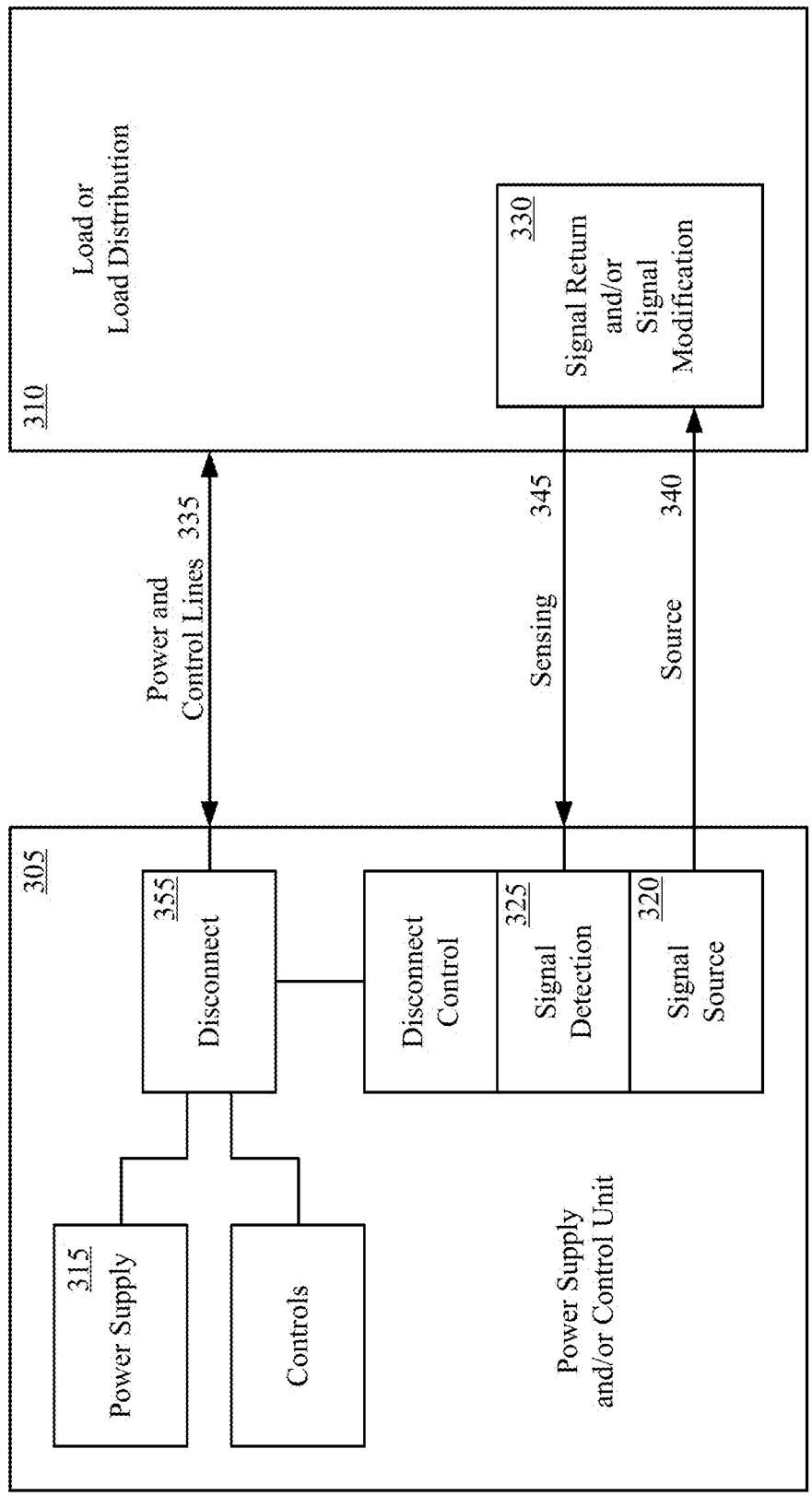
FIG. 3 shows a system with a load control interlock in accordance with another example.

FIG. 3 shows a system with a load control interlock in accordance with another example. The system can include a power supply and/or control unit, and one or more load or load distribution units 310. As illustrated, the power supply 315 can be integral to the control unit 305. In other embodiments, the power supply 315 can be implemented separate from the control unit 305. The control unit 305 can also be integral to the power supply 315. The control unit 305 can include a sensor signal source 320 and a sensor signal detection circuit 325.

The one or more load or load distribution units 310 can include a sensor signal return and/or modification circuit 330. The load or load distribution unit 310 can be coupled by one or more cables 335, 340, 345 to the power source 315, the sensor signal source 320 and sensor signal detection circuit unit 325. In one example, a single multiconductor cable can include one or more power and control lines 335 and one or more sensing lines 340, 345 for coupling the one or more load or load distribution units 310 to the power supply 315 and/or control unit 305. In other examples, different combinations of cables can be used for power lines, control lines, and/or sensing lines.

A sensor signal from the sensor signal source 320 can be coupled by the cable to the sensor signal return and/or modification unit 330 of the load or load distribution unit 310. The sensor signal therefore originates in the control unit 305 or power supply 315. The sensor signal can be an electrical signal or an optical signal. In one implementation, the sensor signal return and/or modification unit 330 can be configured to couple the sensor signal received from the sensor signal source 320 back, unmodified, to the sensor signal detection circuit 325 of the control unit 305. In another implementation, the sensor signal return and/or modification unit 330 can be configured to modify the sensor signal returned to the sensor signal detection unit 325. The sensor signal originating from the sensor signal source unit 320 can propagate on a first pathway 340 within the cable. The modified or unmodified sensor signal received by the sensor signal detection circuit 325 can propagate from the load or load distribution unit 310 to the sensor signal detection circuit 325 on a second pathway 345.

The sensor signal detection circuit 325 can be configured to receive the sensor signal from the cable, recognize an interrupt of the sensor signal received from the cable, and interrupt power coupled to the cable in response to the interrupt. In one embodiment, the sensor signal detection circuit 325 can be configured to detect a continuity sensing signal received on a sensor signal line 345. A disconnect control circuit 350 can be configured to recognize an interruption in the signal received on the sensor signal line 345. The interruption may be indicative of the load or load distribution unit 310 being disconnected from the control unit 305 and/or power supply 315. The interruption may also be indicative of a failure in the integrity of the cable 335-340. A disconnect circuit 355 can be configured to disconnect power from one or more power lines of the cable. The disconnect circuit 355 can also be configured to disconnect one or more control signals from one or more corresponding control lines of the cable.

The sensing signal originating in the control unit 305 or power supply 315 propagates electrically and/or optically, within the one or more connecting cables 340, 345, to the sensor signal detection circuit 325, within the control unit 305 and/or power supply 315. The sensor signal detection circuit 325 operates, such that an interruption in one or more connections between it and the one or more load or load distribution units 310 results in the disconnection of the one or more power supplies and/or control signals. The purpose of the sensor signal detection circuit 325 is to detect the integrity of the one or more cables, the connections between the one or more cables and the control unit 305, the one or more power supplies 315, the one or more load or load distribution units 310, and/or the continuity within the one or more load or load distribution units 310.

Figure 4:
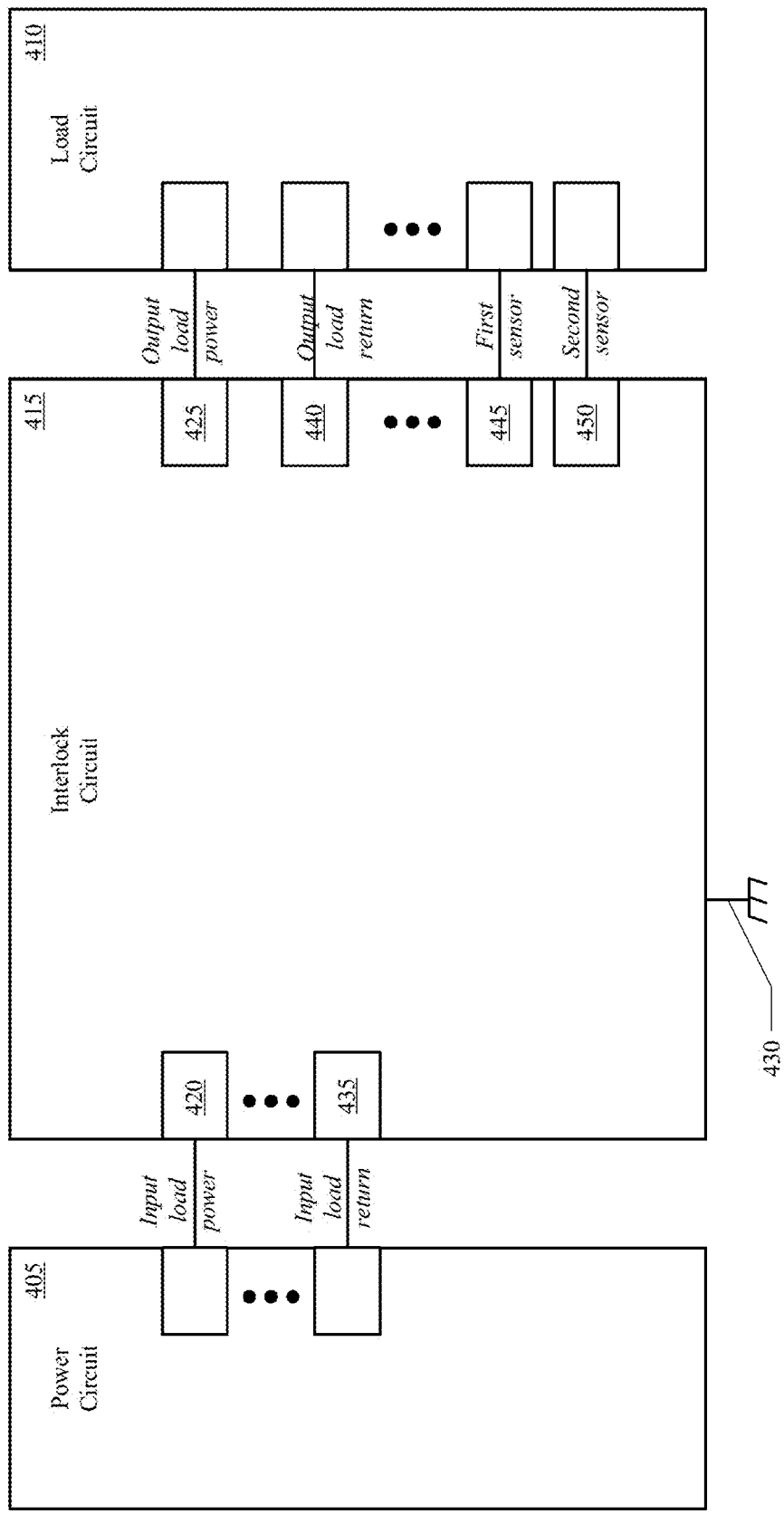
FIG. 4 shows a system with a load control interlock in accordance with another example.

FIG. 4 shows a system with a load control interlock in accordance with another example. The system can include a power circuit 405, one or more load circuits 410, and an interlock circuit 415 electrically coupled between the power circuit 405 and the one or more load circuits 410. The power circuit 405 can be connected to, or removably couplable to, the interlock apparatus 415. Similarly, the one or more load circuits 410 can be connected to, or removably couplable to, the interlock apparatus 415. In one example embodiment, the interlock circuit can include a first switching module and a second switching module described in connection with FIG. 5.

The interlock circuit 415 can provide for coupling the power circuit 405 to the one or more load circuits 410 once the one or more load circuits 410 and the power circuit 405 are both coupled to the interlock circuit 415, and disconnects the power circuit 405 from the one or more load circuits 410 if the load circuit 410 or power circuit 405 are uncoupled form the interlock circuit 415 or an electrical connection between the power circuit 405 and the one or more load circuits 410 is broken.

In one aspect, the interlock circuit 415 can be configured to electrically un-couple an input load power terminal 420 from an output load power terminal 425 and electrically un-couple an input load return terminal 435 from an output load return terminal 440 of the interlock circuit 415, when the power circuit 405 is supplying an 'off' voltage to the interlock circuit 415. Optionally, the interlock circuit 415 can also be configured to electrically couple the output load power terminal 425 to a chassis ground 430. In this aspect, the input terminals 420, 435, are un-coupled from the output terminals 425, 440, when the power circuit 405 is un-coupled from the interlock circuit 415 and therefore supplying an 'off' voltage. Similarly, the input terminals 420, 435 are un-coupled from the output terminals 425, 440 when the power circuit 405 is coupled to the interlock circuit 415 but supplying an 'off' voltage. It is to be appreciated that an 'off' voltage of the power circuit 405 is a voltage range that is indicative that the power circuit 405 is not coupled to the interlock circuit 415 or the power circuit 405 is turned off, and an 'on' voltage of the power circuit 405 is a voltage range that is indicative that the power circuit 405 is coupled to the interlock circuit 415 and turned on. Therefore, when the power circuit 405 is un-coupled from the interlock circuit 415, or the power circuit 405 is turned off, the input load power terminal 420 is un-coupled from an output load power terminal 425 of the interlock circuit 415. In addition, the input load return terminal 435 is un-coupled from an output load return terminal 440 of the interlock circuit 415. Furthermore, the output load power terminal 425 can optionally be coupled to the chassis ground 430.

In another aspect, the interlock circuit 415 can be configured to electrically un-couple the input load power terminal 420 from the output load power terminal 425 and electrically un-couple the input load return terminal 435 from the output load return terminal 440 of the interlock circuit 440, when the power circuit 405 is supplying an 'on' voltage to the interlock circuit 415 and a first keyed signal is present between a first sensor terminal 445 and a second sensor terminal 450 of the interlock circuit 415. Again, the output load power terminal 425 can also be optionally coupled to the chassis ground 430 when the power circuit 405 is supplying an 'on' voltage to the interlock circuit 415 and a first keyed signal is present between a first sensor terminal 445 and a second sensor terminal 450 of the interlock circuit 415. In one aspect, the first keyed signal indicates that the load circuit 410 is un-coupled from the interlock circuit 415. In one instance, the first keyed signal can be a predetermined voltage. For example, the first keyed signal can be a ground potential. Therefore, when the power circuit 405 is turned on and coupled to the interlock circuit 415, but the load circuit 410 is un-coupled from the interlock circuit 415, the input load power terminal 420 is un-coupled from an output load power terminal 425 of the interlock circuit 415. In addition, the input load return terminal 435 is un-coupled from an output load return terminal 440 of the interlock circuit 415. Furthermore, the output load power terminal 425 can optionally be coupled to the chassis ground 430.

In another aspect, the interlock circuit 415 can be configured to electrically couple the input load power terminal 420 to the output load power terminal 425 and electrically couple the input load return terminal 435 to the output load return terminal 440 of the interlock circuit 415, after a delay from when the power circuit 405 is supplying an 'on' voltage to the interlock circuit 415 and a second keyed signal is present between the first sensor terminal 445 and the second sensor terminal 450 of the interlock circuit 415. Again, the output load power terminal 425 can also be optionally electrically un-coupled from the chassis ground 430 after a delay from when the power circuit 405 is supplying an 'on' voltage to the interlock circuit 415 and a second keyed signal is present between the first sensor terminal 445 and the second sensor terminal 450 of the interlock circuit 415. In one aspect, the second keyed signal indicates that the load circuit 410 is coupled to the interlock circuit 415. In one instance, the second keyed signal can be a predetermined current, a pulsed signal, or a unique frequency generated signal. Therefore, when the power circuit 405 is turned on and coupled to the interlock circuit 415, and the load circuit 410 is coupled to the interlock circuit 415, the input load power terminal 420 is coupled to the output load power terminal 425 of the interlock circuit 415. In addition, the input load return terminal 435 is coupled to the output load return terminal 440 of the interlock circuit 415. Furthermore, the output load power terminal 425 can optionally be un-coupled from the chassis ground 430.

The interlock circuit 415 can also be further configured to similarly couple and un-couple one or more other input terminals to and from corresponding output terminals. The other terminals can include other supply potential terminals, sensor terminals, and/or the like.

In one instance, the load circuit 410 can be a light configured for removably coupling between the output load power terminal 425 and the output load return terminal 440 of the interlock circuit 415. The load circuit 410 can also include one or more cables for removably coupling the light between the output load power terminal 425 and the output load return terminal 440 of the interlock circuit 415, and for removably coupling a shunt between the first and second sensor terminals 445, 450 of the interlock circuit 415. The load circuit 410 can also include, in addition or alternatively, a cap comprising the shunt configured for removably coupling between the first and second sensor terminals 445, 450 of the interlock circuit 415. The cap can provide a cover for a connector on the interlock circuit 415 that includes the output load power terminal 425, the output load return terminal 440, the first sensor terminal 445, the second sensor terminal 450, and optionally one or more other applicable terminals. The cap can likewise provide a cover to a connector on one or more of the cables. The load circuit 410 can also optionally include other interconnections and loads, such as couplers to removably couple one or more loads or caps directly to the interlock circuit 415, or indirectly to the interlock circuit 415 through one or more cables, connector, couplers, caps or other similar interconnections and loads. In one aspect, the one or more loads, cables, caps, connectors, couplers or other similar interconnections are configured to be coupled in series such that a shunt in a load, cable, cap, connector, coupler or other similar interconnection is required to complete a conductive path between the first and second sensor terminals of the interlock circuit 415, before the interlock circuit 415 couples the power circuit 405 to the load circuit 410.

Figure 5:
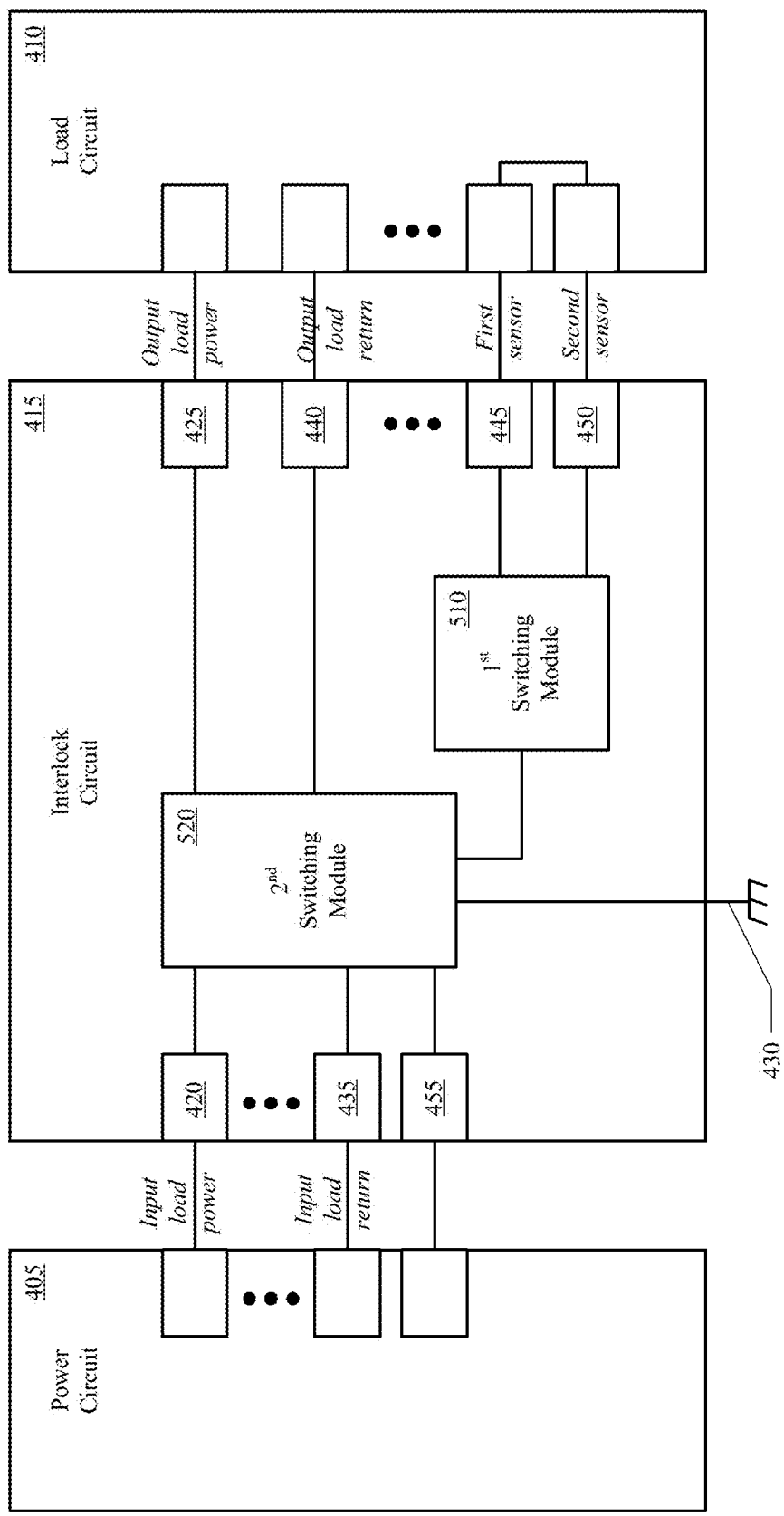
FIG. 5 shows a system with a load control interlock in accordance with another example.

FIG. 5 shows a system with a load control interlock in accordance with another example. The system includes a power circuit 405, one or more load circuits 410 and an interlock circuit 415 coupled between the power circuit 405 and the one or more load circuits 410. The power circuit 405 can be connected to, or removably couplable to, the interlock apparatus 415. Similarly, the one or more load circuits 410 can be connected to, or removably couplable to, the interlock apparatus 415.

In this example, the interlock circuit uses the first switching module 510 and the second switching module 520 to un-couple the input load power terminal 420 from the output load power terminal 425 or to un-couple the input load return terminal 435 from the output load return terminal 440 of the interlock circuit 415. The first switching module 510 can be in a first state when a first keyed signal is detected, and can be in a second state when a second keyed signal is detected. The first keyed signal can indicate that a load circuit 410 is not coupled to the interlock circuit 415. The second keyed signal can indicate that one or more load devices are coupled directly or indirectly to the interlock circuit 415. The second switching module 520 can be configured to un-couple a plurality of input signals from a plurality of output signals when the first switching module is in the first state. The second switching module 520 can also be configured to un-couple the plurality of input signals from the plurality of output signals when the power circuit 405 is un-coupled from the interlock circuit 415 or the power circuit 405 is turned off or not providing a supply potential. The second switching module 520 can be further configured to couple the plurality of input signals to the plurality of output signals a predetermined period of time after when the first switching module is in the second state.

In one example, the first keyed signal can be a predetermined voltage between a first sensor terminal 445 and a second sensor terminal 450 of the interlock circuit 415. In response to the predetermined voltage between the first and second sensor terminals 445, 450 of the interlock circuit 415, the first state of the first switching module 510 can for example be a low voltage state. In response to the low voltage state of the first switching module 510, the second switching module 520 can, for example, un-couple an input load power terminal 420 from an output load power terminal 425, and un-couple an input load return terminal 435 from an output load return terminal 440 of the interlock circuit 415. In response to the low voltage state of the first switching module 510, the second switching module 520 can, for example, also couple the output load power terminal 425 and the output load return terminal 440 to a chassis ground 430 of the interlock circuit 415.

The second keyed signal can be a predetermined current between a first sensor terminal 445 and a second sensor terminal 450 of the interlock circuit 415. In response to the predetermined current between the first and second sensor terminals 445, 450 of the interlock circuit 415, the second state of the first switching module 510 can for example be a high voltage state. In response to the high voltage state of the first switching module 510, the second switching module 520 can, for example, couple the input load power terminal 420 to the output load power terminal 425, and couple the input load return terminal 435 to the output load return terminal 440 of the interlock circuit 415. In response to the high voltage state of the first switching module 510, the second switching module 520 can, for example, also un-couple the output load power terminal 425 and the output load return terminal 440 from the chassis ground 430 of the interlock circuit 415.

In another example, the first keyed signal can be a ground potential. In response to the ground potential, the first state of the first switching module 510 can for example be a low voltage state. In response to the low voltage state of the first switching module 510, the second switching module 520 can, for example, un-couple an input load power terminal 420 from an output load power terminal 425, and un-couple an input load return terminal 435 from an output load return terminal 440 of the interlock circuit 415. In response to the low voltage state of the first switching module 510, the second switching module 520 can, for example, also couple the output load power terminal 425 and the output load return terminal 440 to a chassis ground 430 of the interlock circuit 415.

The second keyed signal can be a pulsed signal. In response to the pulsed signal, the second state of the first switching module 510 can be for example a high voltage state. In response to the high voltage state of the first switching module 510, the second switching module 520 can, for example, couple the input load power terminal 420 to the output load power terminal 425, and couple the input load return terminal 435 to the output load return terminal 440 of the interlock circuit 415. In response to the high voltage state of the first switching module 510, the second switching module 520 can, for example, also un-couple the output load power terminal 425 and the output load return terminal 440 from the chassis ground 430 of the interlock circuit 415.

In yet another example, the first keyed signal can be a ground potential. In response to the ground potential, the first state of the first switching module 510 can be for example a low voltage state. In response to the low voltage state of the first switching module 510, the second switching module 520 can, for example, un-couple an input load power terminal 420 from an output load power terminal 425, and un-couple an input load return terminal 435 from an output load return terminal 440 of the interlock circuit 415. In response to the low voltage state of the first switching module 510, the second switching module 520 can, for example, also couple the output load power terminal 425 and the output load return terminal 440 to a chassis ground 430 of the interlock circuit 415.

The second keyed signal can be a unique frequency generated signal. In response to the unique frequency generated signal, the second state of the first switching module 510 can for example be a high voltage state. In response to the high voltage state of the first switching module 510, the second switching module 520 can, for example, couple the input load power terminal 420 to the output load power terminal 425, and couple the input load return terminal 435 to the output load return terminal 440 of the interlock circuit 415. In response to the high voltage state of the first switching module 510, the second switching module 520 can, for example, also un-couple the output load power terminal 425 and the output load return terminal 440 from the chassis ground 430 of the interlock circuit 415.

The interlock circuit 415 can also be further configured to similarly couple and un-couple one or more other input terminals to and from corresponding output terminals. The other terminals can include other supply potential terminals, sensor terminals, and/or the like.

Figure 6:
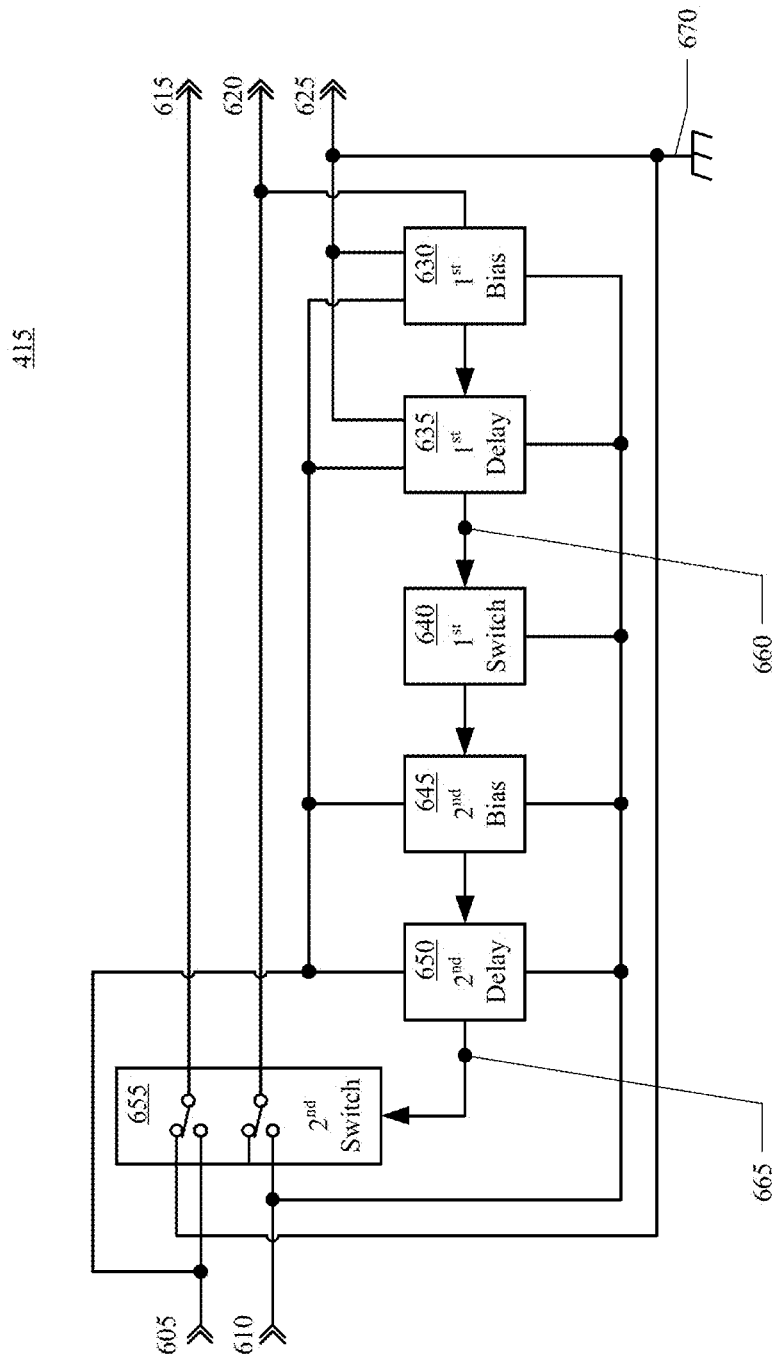
FIG. 6 shows an interlock circuit in accordance with an example.

FIG. 6 shows an interlock circuit in accordance with an example. The interlock circuit 415 includes a plurality of input terminals 605-610, a plurality of output terminals 615-625, a first bias sub-circuit 630, a first delay sub-circuit 635, a first switch sub-circuit 640, a second bias sub-circuit 645, a second delay sub-circuit 650, and a second switch sub-circuit 655. In one implementation, a supply potential can be coupled between a first input terminal 605 and a second input terminal 610. One or more load circuits, cables, connectors, caps, and/or couplers can be coupled to a first output terminal 615, a second output terminal 620, and a third output terminal 625. In addition, the third output terminal 625 can be coupled to a chassis potential of the interlock circuit 415.

In one example, a supply potential of a power supply can be coupled between the first and second input terminals 605, 610. A load can be coupled between the first and second output terminals 615, 620, and a load shunt can be coupled between the second and third output terminals 620, 625. In one implementation, the load is configured to couple to the second output terminal 620 before coupling to the first output terminal 615, and couple to the first output terminal 615 before coupling to the third output terminal 625.

In one aspect, the first bias sub-circuit 630 can be configured to pull a first bias node 660 to a potential voltage above a first switch point voltage when a supply potential to the interlock circuit 415 is within an 'on' range and a connection between the second output terminal 620 and the third output terminal 625 is open. The first bias sub-circuit 630 can also be configured to pull the first bias node 660 to a potential voltage below the first switch point voltage when the supply potential to the interlock circuit 415 is within an 'on' range and a connection between the second output terminal 620 and the third output terminal 625 is closed.

In one aspect, the second bias sub-circuit 645 can be configured to pull a second bias node 665 to a potential voltage above a second switch point voltage when the supply potential to the interlock circuit 415 is within an 'on' range and the potential voltage at the first bias node 660 is below the first switch point voltage. In one aspect, the first switch sub-circuit 640 can be configured to pull the second bias node 665 to a potential voltage below the second switch point voltage when the potential voltage of the first bias node 660 is above the first switch point voltage.

In one aspect, the first delay sub-circuit 635 can be configured to delay a transition of the first bias node 660 from below the first switch point voltage to above the first switch point voltage by a first period when the supply potential to the interlock circuit 415 transitions from an 'off' range to an 'on' range and a connection between the second output terminal 620 and the third output terminal 625 is open. The first delay sub-circuit 635 can also be configured to delay a transition of the first bias node 660 from a potential voltage above the first switch point voltage to below the first switch point voltage by a second period when the supply potential to the interlock circuit 415 is within an 'on' range and a connection between the second output terminal 620 and the third output terminal 625 changes from open to closed.

In one aspect, the second delay sub-circuit 650 can be configured to delay a transition of the second bias node 665 from the potential voltage below the second switch point voltage to above the second switch point voltage by a third period when the supply potential to the interlock circuit 415 transitions from an 'off' range to an 'on' range and a connection between the second output terminal 620 and the third output terminal 625 is open, wherein the third period is greater than the first period. The second delay sub-circuit 650 can also delay a transition of the second bias node 665 from above the second switch point voltage to below the second switch point voltage by a fourth period when the supply potential to the interlock circuit 415 is within an 'on' range and a connection between the second output terminal and the third output terminal changes from open to closed, wherein the fourth period is greater than the second period.

In one aspect, the second switch sub-circuit 655 can be configured to uncouple the first output terminal 615 from the first input terminal 605, couple the first output terminal 615 to the chassis potential 670, and uncouple the second output terminal 620 from the second input terminal 610, when the supply potential to the interlock circuit 415 is within an 'off' range or when the potential voltage at the second bias node 665 is below the second switch point voltage. The second switch sub-circuit 655 can also be configured to uncouple the first output terminal 615 from the chassis potential 670, couple the first output terminal 615 to the first input terminal 605, and couple the second output terminal 620 to the second input terminal 610, when the potential voltage of the second bias node 665 is above the second switch point voltage.

The interlock circuit 415 can also be further configured to similarly couple and un-couple one or more other input terminals to and from corresponding output terminals. The other terminals can include other supply potential terminals, sensor terminals, and/or the like.

Figure 7:
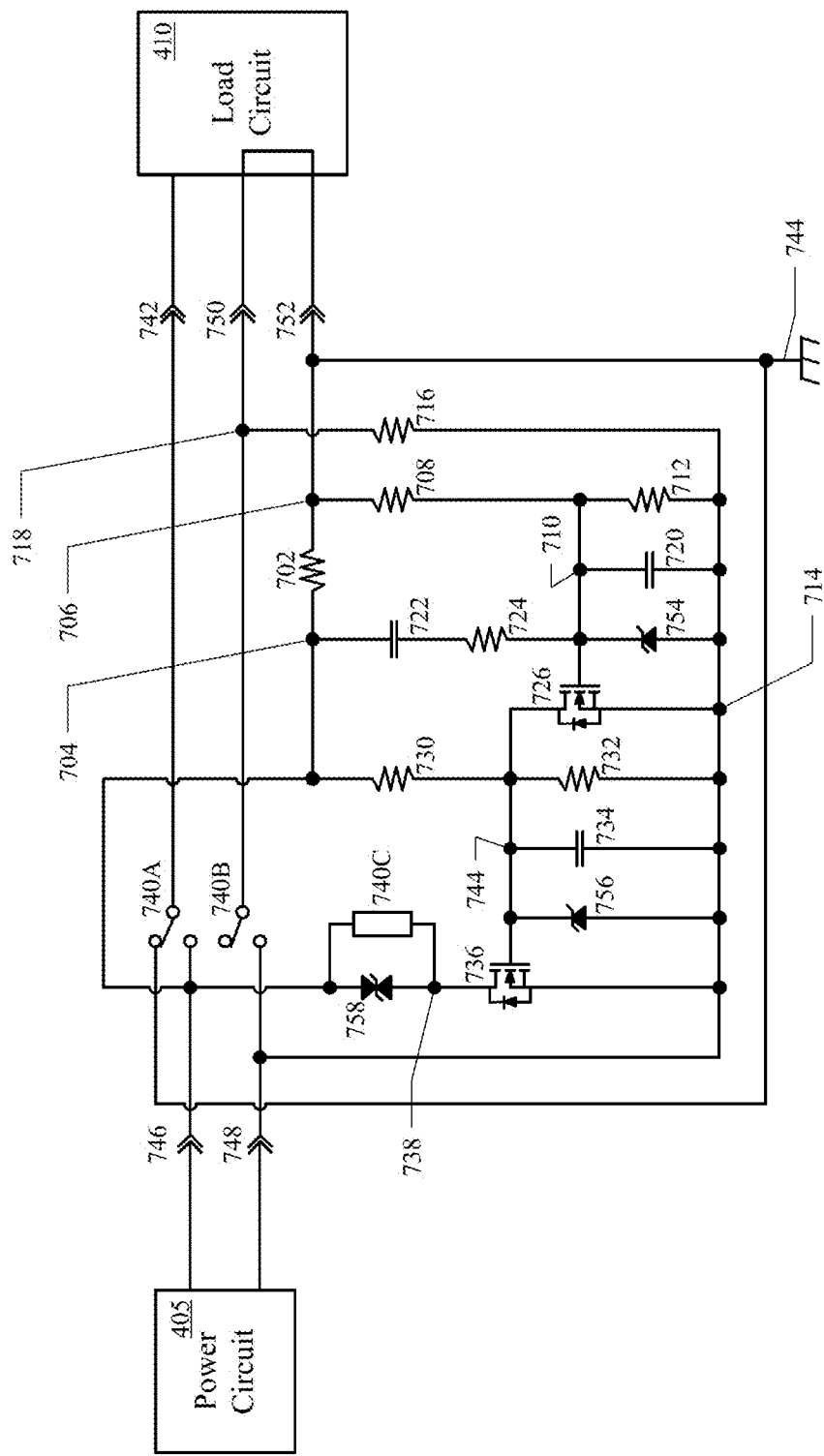
FIG. 7 shows a system with a load control interlock in accordance with another example.

FIG. 7 shows an interlock circuit in accordance with another example. In one aspect, a first resistor 702 can be coupled between a first node 704 and a second node 706. A second resistor 708 can be coupled between the second node 706 and a third node 710. A third resistor 712 can be coupled between the third node 710 and a fourth node 714. A fourth resistor 716 can be coupled between the fourth node 714 and a fifth node 718. A first capacitor 720 can be coupled between the third node 710 and the fourth node 714. A second capacitor 722 and a fifth resistor 724 can be coupled in series between the first node 704 and the third node 710. A first metal oxide silicon field effect transistor (MOSFET) 726 can include a gate coupled to the third node 710, a source coupled to a sixth node 728, and a drain coupled to the fourth node 714.

The interlock circuit 415 can also include a sixth resistor 730 coupled between the first node 704 and the sixth node 728. A seventh resistor 732 can be coupled between the sixth node 728 and the fourth node 714. A third capacitor 734 can be coupled between the sixth node 728 and the fourth node 714. A second MOSFET 736 can include a gate coupled to the sixth node 728, a source coupled to a seventh node 738, and a drain coupled to the fourth node 714. A first time constant of a first sub-circuit including the first, second, third, fourth and fifth resistors 702, 708, 712, 716, 724, and the first and second capacitors 720, 722 can be less than a second time constant of a second sub-circuit including the sixth and seventh resistors 730, 732, and the third capacitor 734.

The interlock circuit 415 can also include one or more relays 740A-C. For example, the relays may include one or more single pole single throw relays, one or more single pole double throw relays, one or more multi pole single throw relays, one or more multi pole double throw relays, or combinations thereof. For instance, the interlock circuit 415 can include two single pole double throw relays, or one double pole double throw relay. The coil 740C of the one or more relays 740A-C can be coupled between the first node 704 and the seventh node 738. A first switch 740A of the one or more relays 740A-C can be configured to couple an output load power terminal 742 to a chassis ground 744 in a normally open state, and couple an input load power terminal 746 to the output load power terminal 742 in a closed state. A second switch 740B of the one or more relays 740A-C can be configured to un-couple an input load return terminal 748 from an output load return terminal 750 in a normally open state, and couple the input load return terminal 748 to the output load return terminal in a closed state 750.

In one aspect, the interlock circuit 415 can optionally include a first Zener diode 754 coupled between the third node 710 and the fourth node 714 to limit a gate voltage at the first MOSFET 726. Similarly, the interlock circuit 415 can optionally include a second Zener diode 756 coupled between the sixth node 744 and the fourth node 714 to limit a gate voltage at the second MOSFET 736. For example, the first and second Zener diodes 754, 756 can clamp the gate voltages to a Zener voltage that is below the rated maximum drain-to-source voltage of the MOSFETs 726, 736. In one instance, the Zener voltage may be between 6V to 18V for a MOSFET rated for a maximum drain-to-source voltage of 20V.

In one aspect, the interlock circuit 415 can optionally include an electromagnetic field (EMF) suppression device 758 coupled in parallel with the one or more coils 740C of the one or more relays 740A-C to limit the reverse voltage when the relay coil 740C is switched off. The EMF suppression device 758, for example, can be a transient voltage suppression (TVS) diode, a varistor, a metal oxide varistor (MOV), a diode, a Zener diode, a series coupled resistor and capacitor, or similar device.

In one aspect, the output load return terminal 750 may be combined with a first sensor terminal. A chassis ground terminal 752, coupled to the chassis ground 744, may also be combined with a second sensor terminal. In one aspect, a load circuit 405 provides a shunt 754 between the combined output load return first sensor terminal 750 and the combined chassis ground second sensor terminal 752 when coupled to the interlock circuit 415.

In one aspect, a power circuit 405 can provide a power supply potential coupled between the input power load terminal 746 and the input power return terminal 748. The power supply potential, coupled between the input power load terminal 746 and the input power return terminal 748, can be coupled to a first pole of a first and second throw 740A, 740B of the one or more relays 740A-C of the interlock circuit 415. In addition, the power supply potential can be coupled can be coupled between the first node 704 and fourth node 714 of the interlock circuit 415.

In one aspect, the first and second resistors 702, 708 can be configured to pull the third node 710 to a potential voltage above a threshold voltage of the first MOSFET 726 when the supply potential coupled between the input power load terminal 746 and the input power return terminal 748 is within an 'on' range and the connection between the combined output load return first sensor terminal 750 and the combined chassis ground second sensor terminal 752 is open. The first and second resistors 702, 708 can also be configured to pull the third node 710 to a potential voltage below the threshold voltage of the first MOSFET 726 when the supply potential coupled between the input power load terminal 746 and the input power return terminal 748 is within the 'on' range and the shunt 754 of the load circuit 410 is coupled between the combined output load return first sensor terminal 750 and the combined chassis ground second sensor terminal 752.

In one aspect, the sixth and seven resistors 730, 732 can be configured to pull the sixth node 728 to a potential voltage above a threshold voltage of the second MOSFET 736 when the supply potential coupled between the input power load terminal 746 and the input power return terminal 748 is within the 'on' range and the potential voltage at the third node 710 is below the threshold voltage of the first MOSFET 726. In one aspect, the first MOSFET 726 can be configured to pull the sixth node 728 to a potential voltage below the threshold voltage of the second MOSFET 736 when the potential voltage of the third node 710 is above the threshold voltage of the first MOSFET 723.

In one aspect, the first, second, third, fourth and fifth resistors 702, 708, 712, 716, 724 and the first and capacitors 720, 722 can be configured to delay a transition of the third node 710 from below to above the threshold voltage of the first MOSFET 726 by a first period when the supply potential transitions from an 'off' range to an 'on' range and the connection between the combined output load return first sensor terminal 750 and the combined chassis ground second sensor terminal 752 is open. The first, second, third, fourth and fifth resistors 702, 708, 712, 716, 724 and the first and capacitors 720, 722 can also be configured to delay a transition of the third node 710 from a potential voltage above to below the threshold voltage of the first MOSFET 726 by a second period when the supply potential is within an 'on' range and the shunt 754 of the load circuit 410 is coupled between the combined output load return first sensor terminal 750 and the combined chassis ground second sensor terminal 752.

In one aspect, the sixth and seven resistors 730, 732 and the third capacitor 734 can be configured to delay a transition of the sixth node 728 from a potential voltage below to above the threshold voltage of the second MOSFET 736 by a third period when the supply potential transitions from an 'off' range to an 'on' range and the connection between the combined output load return first sensor terminal 750 and the combined chassis ground second sensor terminal 752 is open, wherein the third period is greater than the first period. The sixth and seven resistors 730, 732 and the third capacitor 734 can also delay a transition of the sixth node 728 from above to below the threshold voltage of the second MOSFET 736 by a fourth period when the supply potential is within an 'on' range and the shunt 754 of the load circuit 410 is coupled between the combined output load return first sensor terminal 750 and the combined chassis ground second sensor terminal 752, wherein the fourth period is greater than the second period.

In one aspect, the second MOSFET 736 and the one or more relays 740A-C can be configured to uncouple the output load power terminal 742 from the input load power terminal 746, couple the output load power terminal 742 to the chassis potential 744, and uncouple the combined output load return first sensor terminal 750 from the input load return terminal 748 when the supply potential is within an 'off' range or when the potential voltage at the sixth node 728 is below the threshold voltage of the second MOSFET 736. The second MOSFET 736 and the one or more relays 740A-C can also be configured to uncouple the output load power terminal 742 from the chassis potential 644, couple the output load power terminal 742 to the input load power terminal 746, and couple the combined output load return first sensor terminal 750 to the input load return terminal 748 when the potential voltage of the sixth node 728 is above the threshold voltage of the second MOSFET 736.

Figure 8:
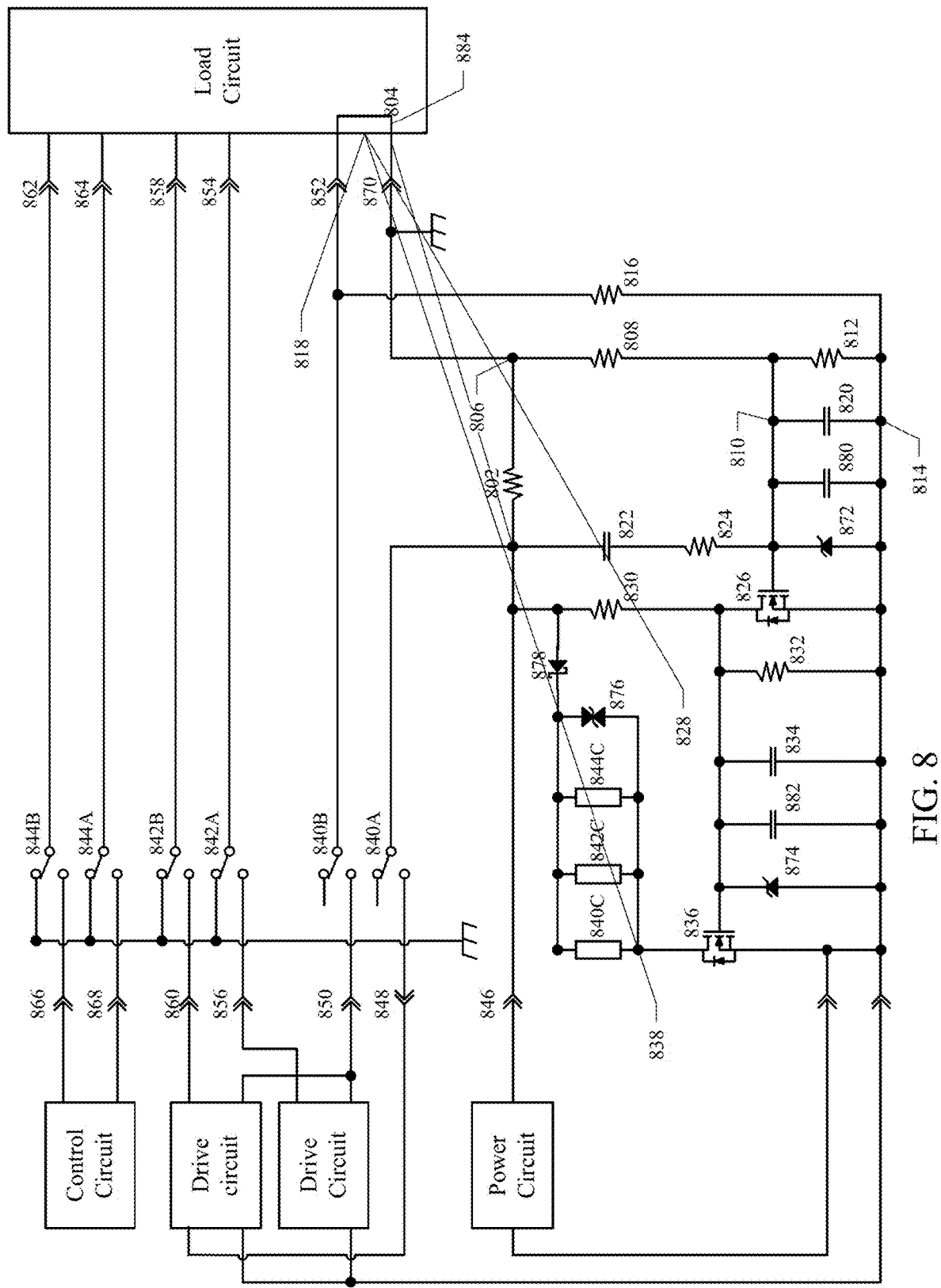
FIG. 8 shows a system with a load control interlock in accordance with another example.

FIG. 8 shows an interlock apparatus in accordance with yet another example. In one aspect, a first resistor 802 can be coupled between a first node 804 and a second node 806. A second resistor 808 can be coupled between the second node 806 and a third node 810. A third resistor 812 can be coupled between the third node 810 and a fourth node 814. A fourth resistor 816 can be coupled between the fourth node 814 and a fifth node 818. A first capacitor 820 can be coupled between the third node 810 and the fourth node 814. A second capacitor 822 and a fifth resistor 824 can be coupled in series between the first node 804 and the third node 810. A first metal oxide silicon field effect transistor (MOSFET) 826 can include a gate coupled to the third node 810, a source coupled to a sixth node 828, and a drain coupled to the fourth node 814.

The interlock circuit 415 can also include a sixth resistor 830 coupled between the first node 804 and the sixth node 828. A seventh resistor 832 can be coupled between the sixth node 828 and the fourth node 814. A third capacitor 834 can be coupled between the sixth node 828 and the fourth node 814. A second MOSFET 836 can include a gate coupled to the sixth node 828, a source coupled to a seventh node 838, and a drain coupled to the fourth node 814. A first time constant of a first sub-circuit including the first, second, third, fourth and fifth resistors 802, 808, 812, 816, 824 and the first and second capacitors 820, 822 can be less than a second time constant of a second sub-circuit including the sixth and seventh resistors 830, 832 and the third capacitor 834.

The interlock circuit 415 can also include one or more relays 840A-C, 842A-C 844A-C. For example, the relays may include one or more single pole single throw relays, one or more single pole double throw relays, one or more multi pole single throw relays, one or more multi pole double throw relays, or combinations thereof. For instance, the interlock circuit 415 can include a double pole single throw relay, and two double pole double throw relays. The coils 840C, 842C, 844C of the one or more relays 840A-C, 842A-C, 844A-C can be coupled between the first node 804 and the seventh node 838. A first switch 840A of the one or more relays can be configured to un-couple an input supply terminal 846 from and output supply terminal 848 in a normally open state, and couple the input supply terminal 846 to the output supply terminal 848 in a closed state. A second switch 840B can be configured to un-couple an output drive return terminal 850 from an input driver return terminal 852 in a normally open state, and coupled the output drive return terminal 850 to the input drive return terminal 852 in a closed state. A third switch can be configured to un-couple a first output drive terminal 854 from a first input drive terminal 856 and couple the first output drive terminal 854 to the chassis ground 844 in a normally open state, and couple the first output drive terminal 854 to the first input drive terminal 854 in a closed state. A fourth switch can be configured to un-couple a second output driver terminal 858 from a second input driver terminal 860 and couple the second output drive terminal 858 to the chassis ground 844 in a normally open state, and couple the second output drive terminal 858 to the second input drive terminal 860 in a closed state. A fifth and sixth switch can be configured to uncouple first and second output control terminals 862, 864 from first and second input control terminals 866, 868 and couple the first and second output control terminals 862, 864 to the chassis ground 844 in a normally open state, and couple the first and second output control terminals 862, 864 to the first and second input control terminal 866, 868 in a closed state.

In one aspect, the interlock circuit 215 can optionally include a first Zener diode 872 coupled between the third node 810 and the fourth node 814 to limit a gate voltage at the first MOSFET 826. Similarly, the interlock circuit 215 can optionally include a second Zener diode 874 coupled between the sixth node 828 and the fourth node 814 to limit a gate voltage at the second MOSFET 836. For example, the first and second Zener diodes 872, 874 can clamp the gate voltages to a Zener voltage that is below the rated maximum drain-to-source voltage the MOSFETs 826, 836. In one instance, the Zener voltage may be between 6V to 18V for a MOSFET rated for a maximum drain-to-source voltage of 20V.

In one aspect, the interlock circuit 215 can optionally include an electromagnetic field (EMF) suppression device 876 coupled in parallel with the one or more coils 840C, 842C, 844C of the one or more relays 840A-C, 842A-C, 844A-C to limit the reverse voltage when the relay coil 840C, 842C, 844C are switched off. The EMF suppression device 876, for example, can be a transient voltage suppression (TVS) diode, a varistor, a metal oxide varistor (MOV), a diode, a Zener diode, a series coupled resistor and capacitor, or similar device. In one aspect, the interlock circuit 215 can optionally include a diode 878 coupled between the one or more coils 840C, 842C, 844C of the one or more relays 840A-C, 842A-C, 844A-C and the first node 804 to further limit reverse voltage that occurs when the relay coils 840C, 842C, 844C are switched off.

In one aspect, the interlock circuit 215 can optionally include a fourth capacitor 880 coupled between the third node 810 and the fourth node 814 and a fifth capacitor 882 coupled between the sixth node 828 and the fourth node 814. The first and fourth capacitors 820, 880 coupled in parallel between the third and fourth nodes 810, 814 can be utilized to realize a larger capacitance value. Similarly, the third and fifth capacitors 834, 882 coupled in parallel between the sixth and fourth nodes 828, 814 can be utilized to realize a larger capacitance value. The first time constant of the sub-circuit further including the fourth capacitor 880 can be less than the second time constant of the sub-circuit further including the fifth capacitor 882.

In one aspect, the output load return terminal 850 may be combined with a first sensor terminal. A chassis ground terminal 870, coupled to the chassis ground 444, may also be combined with a second sensor terminal. In one aspect, a load circuit 205 provides a shunt 584 between the combined output load return first sensor terminal 850 and the combined chassis ground second sensor terminal 872 when coupled to the interlock circuit 215.

In one aspect, a power circuit 205 can provide a power supply potential coupled to the input power supply terminal 846. The power supply potential, coupled to the input power supply terminal 846, can be coupled to a first pole of a first throw 840A of the one or more relays 840A-C, 842A-C, 844A-C of the interlock circuit 215. In addition, the power supply potential can be coupled can be coupled to the first node 404 of the interlock circuit 215.

In one aspect, the first and second resistors 802, 808 can be configured to pull the third node 810 to a potential voltage above a threshold voltage of the first MOSFET 826 when the supply potential is within an 'on' range and the connection between the combined output load return first sensor terminal 852 and the combined chassis ground second sensor terminal 870 is open. The first and second resistors 802, 808 can also be configured to pull the third node 810 to a potential voltage below the threshold voltage of the first MOSFET 826 when the supply potential is within the 'on' range and the shunt 884 of the load circuit 210 is coupled between the combined output load return first sensor terminal 852 and the combined chassis ground second sensor terminal 870.

In one aspect, the sixth and seven resistors 830, 832 can be configured to pull the sixth node 828 to a potential voltage above a threshold voltage of the second MOSFET 836 when the supply potential is within the 'on' range and the potential voltage at the third node 810 is below the threshold voltage of the first MOSFET 826. In one aspect, the first MOSFET 826 can be configured to pull the sixth node 828 to a potential voltage below the threshold voltage of the second MOSFET 836 when the potential voltage of the third node 810 is above the threshold voltage of the first MOSFET 826.

In one aspect, the first, second, third, fourth and fifth resistors 802, 808, 812, 816, 824 and the first, second and fourth capacitors 820, 822, 880 can be configured to delay a transition of the third node 810 from below to above the threshold voltage of the first MOSFET 826 by a first period when the supply potential transitions from an 'off' range to an 'on' range and the connection between the combined output load return first sensor terminal 852 and the combined chassis ground second sensor terminal 870 is open. The first, second, third, fourth and fifth resistors 802, 808, 812, 816, 824 and the first, second and fourth capacitors 820, 822, 880 can also be configured to delay a transition of the third node 810 from a potential voltage above to below the threshold voltage of the first MOSFET 826 by a second period when the supply potential is within an 'on' range and the shunt 884 of the load circuit 210 is coupled between the combined output load return first sensor terminal 852 and the combined chassis ground second sensor terminal 870.

In one aspect, the sixth and seven resistors 830, 832 and the third and fifth capacitor 834, 882 can be configured to delay a transition of the sixth node 828 from a potential voltage below to above the threshold voltage of the second MOSFET 836 by a third period when the supply potential transitions from an 'off' range to an 'on' range and the connection between the combined output load return first sensor terminal 852 and the combined chassis ground second sensor terminal 870 is open, wherein the third period is greater than the first period. The sixth and seven resistors 830, 832 and the third and fifth capacitor 834, 882 can also delay a transition of the sixth node 828 from above to below the threshold voltage of the second MOSFET 836 by a fourth period when the supply potential is within an 'on' range and the shunt 884 of the load circuit 210 is coupled between the combined output load return first sensor terminal 852 and the combined chassis ground second sensor terminal 870, wherein the fourth period is greater than the second period.

In one aspect, the second MOSFET 836 and the one or more relays 840A-C, 842A-C, 844A-C can be configured to un-couple the output power supply terminal 848 from the input power supply terminal 846, un-couple the output load return terminal 852 from the input load return terminal 850, un-couple the first and second driver output terminals 854, 858 from the first and second drive input terminals 856, 860 respectively, couple the first and second driver output terminal 854, 858 to the chassis potential 844, un-couple the first and second output control terminals 862, 864 from the input control terminals 866, 868 respectively, and couple the output control terminals 866, 868 to the chassis potential 844, when the supply potential is within an 'off' range or when the potential voltage at the sixth node 828 is below the threshold voltage of the second MOSFET 836. The second MOSFET 836 and the one or more relays 840A-C, 842A-C, 844A-C can also be configured to couple the output power supply terminal 848 to the input power supply terminal 846, couple the output load return terminal 852 to the input load return terminal 850, un-couple the first and second driver output terminal 854, 858 from the chassis potential 844, couple the first and second driver output terminals 854, 858 to the first and second drive input terminals 856, 860 respectively, un-couple the output control terminals 866, 868 from the chassis potential 844, and couple the first and second output control terminals 862, 864 to the input control terminals 866, 868 respectively, when the potential voltage of the sixth node 828 is above the threshold voltage of the second MOSFET 836.

Figure 9:
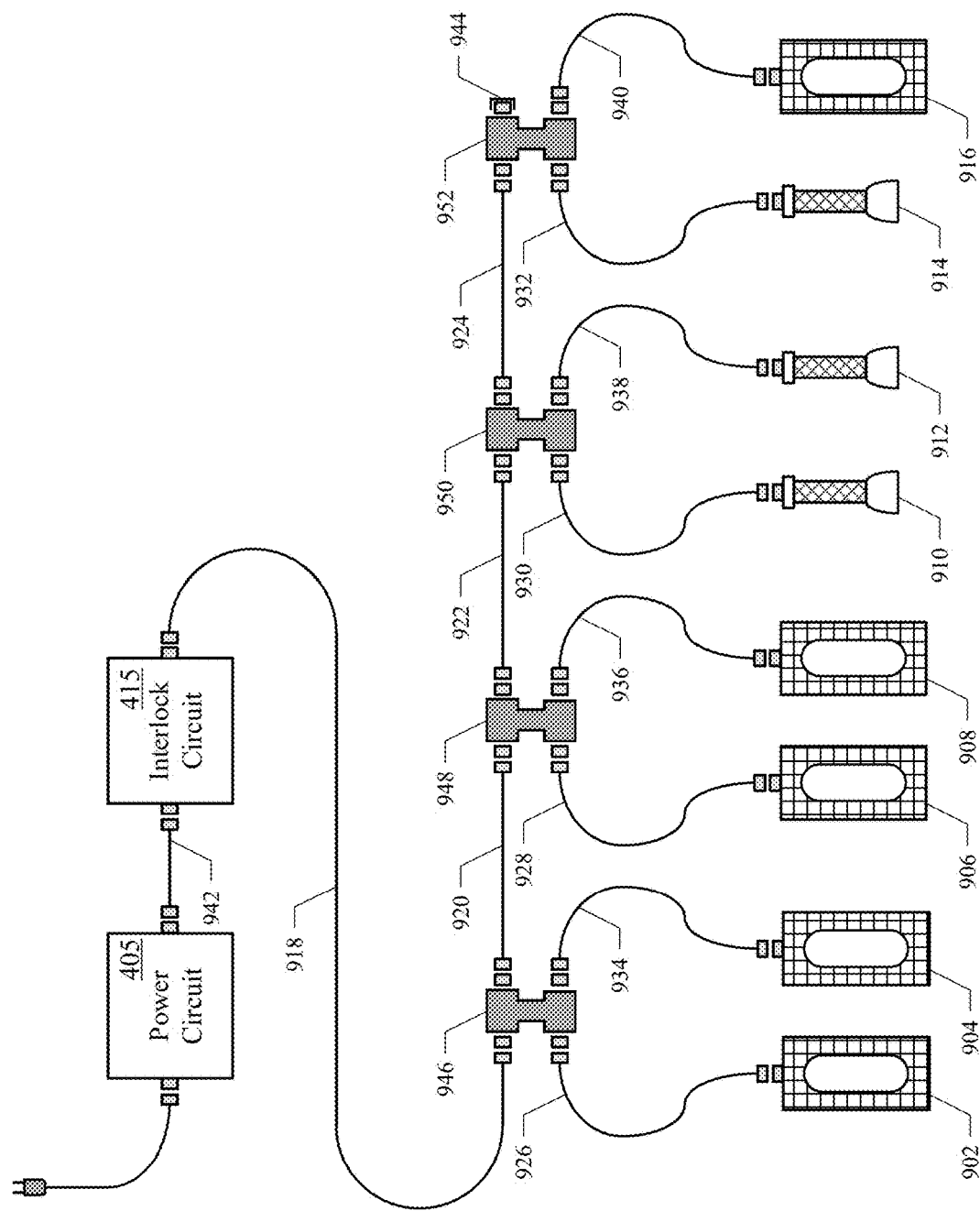
FIG. 9 shows a system with a load control interlock in accordance with yet another example.

FIG. 9 shows a system with a load control apparatus in accordance with another example. The system can include a power circuit 205, one or more load circuits 902-952, and an interlock circuit 215 coupled between the power circuit 405 and the one or more load circuits 902-952. In one aspect, the one or more load circuits 210 can include one or more load devices 902-916 configured for removably coupling between the output load power terminal and the output load return terminal of the interlock circuit 415. In one instance, the load devices 902-916 can be lights. The one or more load circuits 902-952 can also include one or more cables 918-942 removably coupling the load devices 902-916 between the output load power terminal and the output load return terminal of the interlock circuit 415, and for removably coupling a shunt between the first and second sensor terminals of the interlock circuit 415. The one or more load circuits 410 can also optionally include other interconnections and load devices, such as couplers 946-952 to removably couple one or more load devices 902-916 directly or indirectly to the interlock circuit 415 through one or more cables 920-942, connector, couplers or other similar interconnections and load devices 902-916. The one or more load circuits 902-952 can also include, in addition or alternatively, one or more caps 944 comprising the shunt configured for removably coupling between the first and second sensor terminals of the interlock circuit 415. The one or more caps 944 can provide a cover for a connector on the interlock circuit 415, on one or more of the cables 918-942, one or more couplers 946-952, or similar interconnections or load devices. In one aspect, the one or more load devices 902-916, cables 918-942, caps 944, connectors, couplers 946-952 or other similar interconnections are configured to be coupled in series such that a shunt in a load device 902-916, cable 918-942, cap 944, connector, coupler 946-952 or other similar interconnection or load device completes a conductive path between the first and second sensor terminals of the interlock circuit 415, before the interlock circuit 415 couples the power circuit 405 to the load circuit 410. As illustrated in FIG. 9, the interlock circuit 415 can be implemented as a separate circuit. In other implementations, however, the interlock circuit 415 can be integral to the power circuit 405, or one or more other circuits, such as one or more couplers 952 or other similar interconnecting devices.

Figure 10:
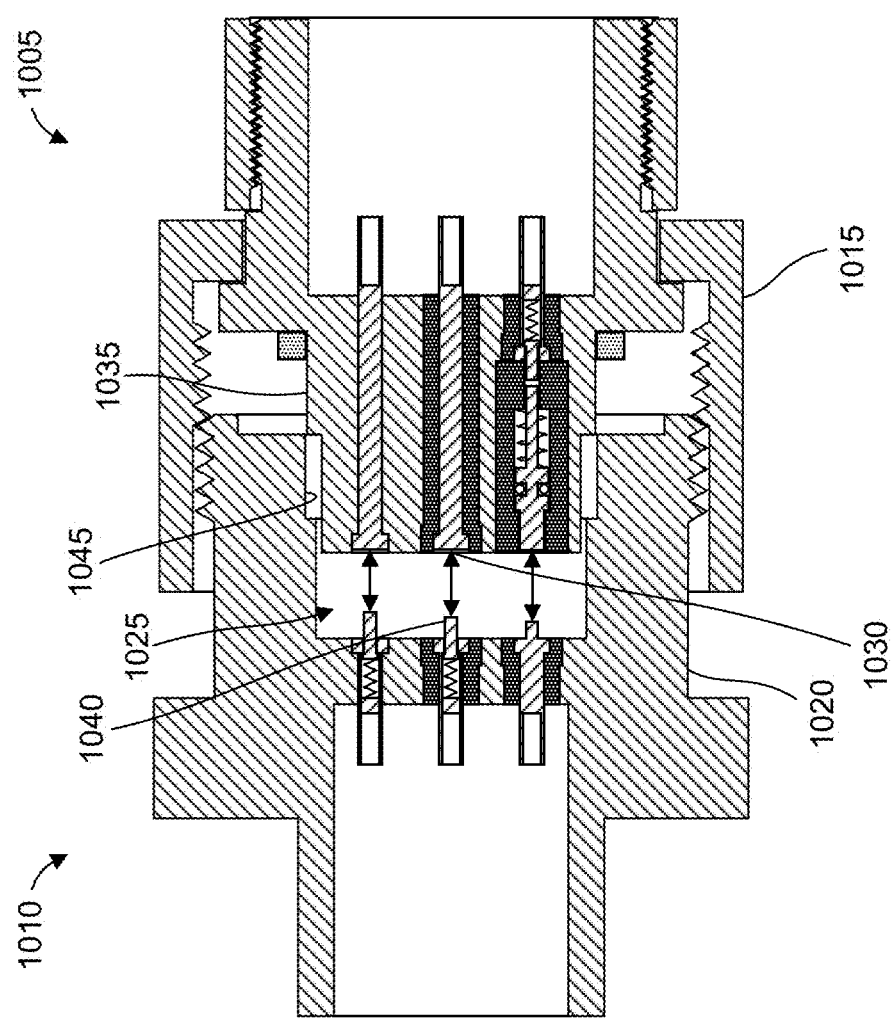
FIG. 10 shows a connector for use in combination with a load control interlock in accordance with an example.

FIG. 10 shows connectors for use in combination with a load control interlock in accordance with an example. The connectors can be a plug connector 1005 and/or a receptacle connector 1010. In one aspect, the connectors 1005, 1010 can include mating housings 1015, 1020 configured to mechanically couple respective plug and receptacle, and establish a spark, arc, flame or the like containment space 1025.

In one aspect, a first connector 1005 can include a first connector body having one or more contacts 1030 and an outer surface 1035. A second connector 1010 can include a second connector body having one or more contacts 1040 and an inner surface 1045. The first and second connectors 1030, 1040 can be engaged and disengaged from each other in an axial direction. The outer surface 1035 of the first connector 1005 and the inner surface 1045 of the second connector 1010 can establish an isolation enclosure containing mating portions of the one or more contacts 1030, 1040 of the first and second connectors 1005, 1010 when the first and second connectors 1005, 1010 are engaged beyond a first predetermined extent. The respective ones of the one or more contacts 1030, 1040 of the first and second connectors 1005, 1010 can electrically couple together when the first and second connectors 1005, 1010 are engaged beyond a second predetermined extent. The isolation enclosure can be established prior to electrical coupling of respective ones of the one or more contacts 1030, 1040 of the first and second connectors 1005, 1010. Similarly, respective ones of the one or more contacts 1030, 1040 of the first and second connectors 1005, 1010 can electrically uncouple from each other when the first and second connectors 1005, 1010 are engaged less than the second predetermined extent. The isolation enclosure can be unestablished, after the electrical uncoupling of respective ones of the one or more contacts 1030, 1040 of the first and second connectors, when the first and second connectors 1005, 1010 are engaged less than the first predetermined extent. Accordingly, the isolation enclosure can contain an explosion or fire of gas, liquids or solid particulates due to sparking or arcing when respective contacts 1030, 1040 are electrically coupling and uncoupling.

In one aspect, respective ones of the one or more contacts 1030, 1040 can electrically couple and uncouple in a predetermined sequence. For example, respective ground contacts in the first and second connectors 1005, 1010 can electrically couple together prior to respective load return contacts. The respective load return contacts of the first and second connectors 1005, 1010 can electrically couple together prior to respective load power contacts. The respective load power contacts can electrically couple together prior to respective sensor contacts. Similarly, the respective sensor contacts can electrically uncouple first and the respective ground contacts can uncouple last. In one instance, different protrusion lengths of one or both of each of the respective contacts 1030, 1040 can establish an order of coupling and uncoupling of the respective ones of the one or more contacts 1030, 1040 of the first and second connectors 1005, 1010. Accordingly, the order of coupling and uncoupling of respective contacts 1030, 1040 can be adapted to reduce the chance of sparking or arcing when respective contacts 1030, 1040 are electrically coupling and uncoupling. Furthermore, the order of coupling and uncoupling of respective contacts can be utilized in conjunction with embodiments of the interlock apparatus to uncouple power supply potentials from corresponding contacts 1030, 1040 of the first and/or second connectors 1005, 1010 until after coupling of respective contacts can be established for a predetermined period of time, or when respective contacts are uncoupled, thereby further reducing the chance of sparking or arcing. Additional description of corresponding connects can be found in copending U.S. patent application Ser. No. 16/040,480, filed Jul. 19, 2018, entitled "Safety Electrical Power Connector," that is incorporated herein by reference.

Accordingly, embodiments of the present technology disconnect supply potentials and other control lines when a load and/or power supply are not coupled to the interlock apparatus. In addition, the interlock advantageously delays coupling supply potential and other control lines a short period of time to insure that the power supply is on and/or the load is coupled to the interlock apparatus. The embodiments therefore advantageously reduce the potential for sparking, arching and the like, when power supply is turning on, the load is being coupled, and/or cables coupling the power supply or load are damaged or severed.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. An apparatus comprising:
   a power supply configured to couple power to a power line in a cable; and
   a sensor signal detection circuit configured to,
   receive a sensor signal from a sensor signal line distinct from the power line in the cable, the sensor signal line being distinct from the power line the cable, wherein the sensor signal originates in the load or load distribution unit;
   recognize an interruption of the sensor signal received from the sensor signal line in the cable; and
   interrupt the power coupled to the cable in response to the interruption of the sensor signal.

2. The apparatus of claim 1, further comprising:
   a load or load distribution unit coupled by the power line in the cable to the power supply and by the sensor signal line in the cable to the sensor signal detection circuit.

3. The apparatus of claim 2, wherein the load or load distribution unit is configured to couple the sensor signal to the sensor signal line in the cable.

4. The apparatus of claim 2, wherein
   the power supply is further configured to couple the sensor signal that originates in the power supply to the cable.

5. The apparatus of claim 4, wherein the sensor signal received by the sensor signal detection circuit from the sensor signal line in the cable is unmodified from the sensor signal that originates in the power supply.

6. The apparatus of claim 4, wherein the sensor signal received by the sensor signal detection circuit from the sensor signal line in the cable is modified by the load or load distribution unit from the sensor signal that originates in the power supply.

7. The apparatus of claim 1, wherein the sensor signal comprises an electrical signal.

8. The apparatus of claim 1, wherein the sensor signal comprises an optical signal.

9. The apparatus of claim 1, wherein the sensor signal detection circuit is integral to the power supply.

10. The apparatus of claim 2, further comprising:
    a control unit configured to couple the sensor signal that originates in the control unit to the cable.

11. The apparatus of claim 10, wherein the sensor signal received by the sensor signal detection circuit from the cable is unmodified from the sensor signal that originates in the control unit.

12. The apparatus of claim 10, wherein the sensor signal received by the sensor signal detection circuit from the cable is modified by the load or load distribution unit from the sensor signal that originates in the control unit.

13. The apparatus of claim 10, wherein the sensor signal that originates from the control unit and the sensor signal received by the sensor signal detection circuit propagate on a same pathway within the cable.

* * * * *